United States Patent
Fischer

(10) Patent No.: US 8,315,382 B2
(45) Date of Patent: Nov. 20, 2012

(54) METHOD FOR MONITORING EXECUTION OF DATA PROCESSING PROGRAM INSTRUCTIONS IN A SECURITY MODULE

(75) Inventor: Jean-Bernard Fischer, Preverenges (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 246 days.

(21) Appl. No.: 12/796,383

(22) Filed: Jun. 8, 2010

(65) Prior Publication Data

US 2010/0310068 A1  Dec. 9, 2010

(30) Foreign Application Priority Data

Jun. 8, 2009 (EP) .................................. 09162209

(51) Int. Cl.
*G06F 7/04* (2006.01)
*G06F 17/30* (2006.01)
*H04L 9/00* (2006.01)

(52) U.S. Cl. ................ 380/43; 726/26; 726/27; 726/28; 726/29

(58) Field of Classification Search ............... 380/43; 726/26–29
See application file for complete search history.

(56) References Cited

U.S. PATENT DOCUMENTS

| | | | |
|---|---|---|---|
| 5,892,935 A * | 4/1999 | Adams ........................ | 712/207 |
| 6,006,328 A | 12/1999 | Drake | |
| 6,311,320 B1 * | 10/2001 | Jibbe ........................... | 717/111 |
| 6,658,602 B1 | 12/2003 | Nakano | |
| 6,959,391 B1 | 10/2005 | Baldischweiler | |
| 7,168,065 B1 | 1/2007 | Naccache et al. | |
| 2002/0091938 A1 | 7/2002 | Hiltunen et al. | |
| 2005/0034010 A1 | 2/2005 | Von Wendorff | |
| 2006/0047955 A1 | 3/2006 | Prevost et al. | |
| 2006/0109982 A1 * | 5/2006 | Puiatti et al. ................ | 380/200 |
| 2007/0174617 A1 | 7/2007 | Carrel et al. | |

FOREIGN PATENT DOCUMENTS

| | | |
|---|---|---|
| EP | 1 056 012 | 11/2000 |
| GB | 2 416 956 | 2/2006 |
| WO | WO 96/06504 | 2/1996 |
| WO | WO 00/70427 | 11/2000 |
| WO | WO 2004/066127 | 8/2004 |
| WO | WO 2008/025900 | 3/2008 |

OTHER PUBLICATIONS

International Search Report issued in International Application No. PCT/EP2010/057875, mailed Jul. 22, 2010.

(Continued)

*Primary Examiner* — Peter Shaw
(74) *Attorney, Agent, or Firm* — DLA Piper LLP US

(57) ABSTRACT

A method for monitoring execution of a sequence of data processing program instructions in a security module associated to a multimedia unit connected to a managing center supplying control messages authorizing access to broadcast data streams. The security module comprises a processor for executing the instructions, a memory, and a monitoring module for analyzing the instructions before execution by the processor. The managing center comprises a security module emulator generating reference data sets by executing a sequence of instructions induced by data of a given control message in the program. The reference data sets are appended to control messages sent to the security module. The monitoring module analyzes a sequence of program instructions for determining a check data set which is compared with a reference data set received from the control messages. When the reference and check data sets match, the program continues executing. Otherwise, further control message processing stops.

26 Claims, 2 Drawing Sheets

OTHER PUBLICATIONS

Written Opinion issued in International Application No. PCT/EP2010/057875, mailed Jul. 22, 2010.

European Search Report issued in EP 09162209.2, mailed Dec. 23, 2009.

* cited by examiner

METHOD FOR MONITORING EXECUTION OF DATA PROCESSING PROGRAM INSTRUCTIONS IN A SECURITY MODULE

FIELD OF THE INVENTION

The present invention relates to the field of computer program security, and more particularly a method for detecting undesirable operations carried out at execution of a data processing program in a security module associated to a multimedia unit.

TECHNICAL BACKGROUND

The processor part of a security module executes a program in low-level language where the commands are formulated according to a structure very close to that of the program instructions. The program requires only to be compiled before being able to be executed. Low-level languages or machine code, are used notably for programming microprocessors executing specific instructions. In a program in high-level language, the commands have a structure closer to natural language, but on the other hand further away from that used by the processor. The commands written in high-level languages must first of all be interpreted, i.e. converted into machine code commands, before then being able to be put in the form of instructions understandable by the processor. Thus any computer program gives rise to a series of instructions adapted to the processor for which it is intended.

Securing a computer program means: detecting malicious attacks seeking to modify the normal behavior of the computer program, and making the execution of a computer program reliable. The method of the present invention as discussed below can in particular detect an attack intended to modify the execution of a computer program executed in a security module. In particular it can detect attacks by interference with the operation of the security module often referred to as fault attacks. Such attacks aim to modify illicitly the content of a register, memory or bus or to oblige a processor not to execute certain instructions of the program. In this case, the attacked computer program may be executed in a very different way from that in which it was designed to be executed. Among others, they may, in known manner, be made by: generating a voltage spike at one of the power supply terminals of the processor, suddenly increasing its temperature, quickly changing its clock frequency or its power supply voltage, applying a flash of light or a laser beam to a portion of the silicon constituting it. According to the state of the art, the person skilled in the art has various ways to combat fault attacks. In particular, most security module components include sensors that detect such attacks. But their efficiency is limited because it is impossible in practice to provide sensors over the whole of the surface of the component. Moreover these sensors are likewise made of silicon, it is possible to interfere with them or to modify the information that they transmit.

Several documents describe solutions for securing a program implemented in a portable carrier such as a smart card or other programmable data processing devices equipped with microprocessors, signal processors, controllers, interfaces and memories.

U.S. Pat. No. 6,006,328 describes a process of including computer code to automatically detect tampering of said computer software, and computer code to prevent the theft of ID-Data by replacing existing vulnerable software or operating system code with secure equivalents which utilize anti-spy techniques. Detecting tampering is achieved with the use of code which is protected from disassembly and examination through obfuscation and encryption, which re-reads its own external-image and compares it with its known memory image or pre-calculated check-data to detect the modification of software sometime after it has been loaded from disk, but before execution of the modified section has commenced. Additionally, the software can scan the memory image of itself one or more times, or continuously, to ensure that unexpected alterations do not occur.

WO2008025900 describes a security processor for a decoder able to receive a scrambled multimedia signal. The processor comprises at least one first rewritable lock whose value can be toggled between a first and a second predetermined value in response to an EMM or ECM message, a restriction function able to authorize and, alternately, prohibit, as a function of the value of the first lock, only one particular operation of the security processor, this particular operation being chosen from the group composed of: the use of a cryptographic key, the processing of a parameter contained in an EMM or ECM message received, and the execution of an elementary conditional access function of the code of the application.

U.S. Pat. No. 6,959,391, describes a method for protecting computer core from external manipulation wherein a check sum is determined from several register contents of the processor by mathematical combination, for example by an exclusive-OR operation, after an instruction has been processed by the processor and stores it in a memory as a final check sum. Before the next instruction is processed by the processor a check sum is formed again, that is, the initial check sum. By comparing the initial check sum with the final check sum, which must match, one can ascertain whether register contents of the processor were manipulated after the last instruction processing.

WO2004/066127 describes a method for making secure execution of a set of at least one instruction in computer program. The method includes a first step of calculating and storing, prior to execution of the computer program, a first signature representing the expected execution of the set of instructions; a second step of calculating and storing, during execution of the set of instructions, a second signature representing the execution of the set of instructions; and a step of detecting an anomaly of execution of the set of instructions by comparing the first and second signatures.

US2005034010 relates to a microcontroller containing a core, memory devices which are connected to the core via a first bus, peripheral units which are connected to the core via a second bus, as well as a monitoring device which is connected to the core. The core reads from the memory devices data representing commands and operands, and carries them out. The monitoring device monitors the correct operation of the core by receiving from the core data depending on the running of the program carried out by the core, compares the received data with previously defined data in response to predetermined events or at predetermined times, and assumes that the core is operating correctly if the compared data items match. If the compared data items do not match, the core takes suitable actions such as generating an interrupt or resetting the microcontroller.

U.S. Pat. No. 7,168,065 describes a method and a device for monitoring the progress in execution of a series of instructions of a computer program, consisting of analyzing the sequence of instructions transmitted to the processor intended to execute the program being monitored and to verify the result of this analysis with reference data recorded with the said program. Thus all the instructions included in the set of instructions under consideration have indeed been transmitted to the processor with a view to their execution. The reference data can for example be a value pre-established so as to correspond to the result of the analysis performed during the monitoring method only if all the instructions in the sequence of instructions have actually been analyzed during the running of the program. The analysis step comprises the sub steps of extracting a data item from each instruction transmitted to the processor and of predetermined calculation on each data item thus extracted, and the verification step includes the comparison of the analysis result with the reference data. The running of the program is interrupted when it is detected that the verification value does not correspond to the reference value. This interruption can be accompanied by an invalidation action for future use of the device comprising the computer program monitored if the non-correspondence between the verification value and the reference value is detected a predetermined number of times.

US2006047955 discloses a system and a method for guarding against unauthorized manipulation or unintentional modification an application program of a multi-application smart card by partitioning the application into a plurality of basic blocks. Each basic block has one entry point and one exit point and comprises a set of data units. A check value associated with a basic block is computed based on a function of the data units of the basic block. The corresponding check value is buffered while the check value is re-computed either during runtime execution of the application program or prior to its execution. A verification is carried out to determine that the re-computed check value and the buffered check value are the same.

WO00/70427 discloses a method and a system for authenticating a program code. A first check sum is computed at the program code, the computed check sum is compared with a second check sum known to be valid. In response to the comparison the program code is proved to be authentic in case the first check sum matches with the second check sum. Further, a predetermined challenge is added to the program code after which the first check sum is computed at the combination of the program code and the challenge. In this way, the applications requiring high security may be certified dependably and variably.

US2007174617 describes a method for updating the firmware of a security module allowing it to "jump" towards a dedicated separate patch message stream thanks to a trigger messages stream broadcasted in a main stream of management messages. The trigger messages comprise version information allowing establishing whether the security module is up-to-date, and an identifier indicating to the security module the suitable patch stream. If the current version of the firmware of the security module is inferior to the patch version, the security module is directed towards the stream of patch messages designated by the identifier included in the trigger messages. Once the update of the firmware is complete, the security module is again directed towards the main stream. This return can be carried out automatically, namely with a switch message comprising an identifier of the first stream.

GB2416956 discloses a method of testing the integrity of operation of at least part of the mobile radio communications device and comprising the steps of transmitting a test sequence generally comprising a hash function to the device, determining and then transmitting the correct result of the test embodied by the test sequence to the device, applying the test sequence to a selected part of the device, and conducting a comparison of the result of the application of the test sequence with the said transmitted correct result so as to identify a potential compromise in the integrity of the said at least one part of the device if the said comparison indicates that the two said results are different.

EP1056012 discloses an apparatus for detecting abnormality in execution state of a control program. An electronic control unit to which the apparatus for detecting abnormality is applied is provided with a CPU, and a memory for storing a set value representing the number of sub-routines to be executed in each of a series of operations of the control program to be repeatedly executed. The CPU includes a control processor for drive-controlling a door lock motor by executing the control program; a counter for counting the number of the sub-routines that have been executed actually in each of the series of the operations; and a detector which compares the set value stored in the memory with a count value of the counter at the last of the series of the operations, detects that the execution state of the control program is abnormal when the two values are different from each other, and then performs reset of the control processor.

In the context of a pay TV system, a plurality of multimedia units connected to a management center of an operator receive and process broadcast data streams according to access rights stored in one or more security modules associated to these units. Multimedia units apply to various kinds of terminals such as personal computers, decoders or set top boxes or mobile equipments.

A security module is a well-known tamper-proof device containing different encryption/decryption keys, information for identifying a user on a network and data defining rights acquired by the user for receiving a content of broadcast services. The security module can have different forms such as a removable contact or contactless smart card inserted in a reader, an integrated circuit welded on a mother board, a card of a SIM (Subscriber Identity Module) type present in the most of mobile equipments.

A multimedia unit includes a hardware and software central module of access control linked to the security module, to a module for demultiplexing the stream, to a decryption module, to applications such as an electronic program guide and to a return channel towards a managing center. The module of access control is in charge of, among other functions, forwarding, towards the security module, control messages ECM and rights management messages EMM extracted from the demultiplexed stream of digital audio video content data. The security module decrypts verifies and processes the control messages ECM according to rights stored and updated by the management messages EMM. The control words, extracted from the control messages ECM after their successful verification, are then transmitted if access is granted to the decryption module in order to generate data in clear ready to be exploited by the user.

At processing of ECM or EMM messages, the program instructions flow executed by the processor of the security module becomes complex due to the multiple branches, tests, jumps, functions calls etc. performed by the program. The methods for protecting a program against tampering of the prior art are expensive in code size to implement and are very difficult to maintain. They have a very limited scope as they cannot take into consideration any event dependant on data in the execution flow, like conditional branches or data dependant loops. Therefore, these methods are used on small blocks of linear code without branches or loops, and cannot take into consideration the value of the data that is processed.

Fault attacks on security modules typically target data, code branches and loops to achieve interesting behaviors. Thus, state of the art methods are not usable to protect data dependant code flow.

SUMMARY OF THE INVENTION

An aim of the present invention is, besides overcoming prior art drawbacks, to prevent that operations are carried out in a security module without a rigorous control or monitoring by the operator of the security module. As the operator cannot monitor individually each security module of the plurality of multimedia units, the solution aims to anticipate the flow of program parts run by all security modules and ensure that these flows are performed exactly as anticipated.

This aim is achieved by a method for monitoring an execution of a sequence of instructions of a data processing program in a security module associated to a multimedia unit connected to a managing center configured for supplying control messages authorizing the multimedia unit to access broadcast audio video content data streams, said security module comprising at least one processor executing the data processing program instructions, a memory, a monitoring module for analyzing the instructions sent to the processor and for verifying the result of the analysis by comparison with reference data, the method comprising steps of:

- determining, by the managing center, with a security module emulator at least one reference data set by executing the sequence of instructions induced by the data of a given control message, in the data processing program used by the security module of the multimedia unit,
- appending the reference data set into the control message previously processed and sending the control message to the multimedia unit with a stream of access controlled audio video content data,
- receiving, by the multimedia unit, the control message and loading the control message into the security module for extracting and storing in a memory the reference data set appended by the managing center,
- launching, by the security module, the data processing program including a command activating the monitoring module for analyzing instructions in said data processing program according to a sequence defined by parameters associated to the command,
- determining, by the monitoring module, a check data set resulting from the analysis of the sequence of instructions,
- comparing the check data set with the stored reference data set extracted from the control message,
- sending instructions, by the monitoring module, to the security module processor, said instructions determining, according to the result of the comparison, further execution by the processor of the data processing program.

The managing center of the operator has complete knowledge on the correct functioning of the security module without any modification of its program. Thus the behavior of the security module can be recorded when it executes each program instruction during processing of control and management messages. The security module emulator generates reference data sets when a sequence of program instructions is executed.

According to a preferred embodiment, the sequence of instructions is induced by the data of a given control message in the data processing program used by the security module of the multimedia unit. For example, a set of program instructions are used to read and process a control message. These operations produce data such as parameters, constants and/or variables used as execution results which may be also used by other instructions of the sequence. The reference data set thus depends not only on the instructions sequence alone, but also on the data involved at execution of the instructions. As the control messages change regularly, the reference data set will be different for each control message. The security module then verifies integrity of the program instructions by executing the same instructions sequence using the same control message data than the ones used by the emulator. In this preferred embodiment, both the opcode (operation code) and the operands (data) at each step of the sequence are used as reference data.

In another embodiment, the security module emulator determines the reference data set only on the basis of the instruction's opcode at each step of the sequence, the sequence being still dependent on the data of the control message.

In a further embodiment the security module emulator determines the reference data set on the basis of execution of an instructions sequence independently of the data of the control message. For example the emulator executes a piece of program used by each security module before receiving a control message. The reference data set will then remain constant until specific command is activated to change the content of the sequence.

The emulator is here defined as either a hardware and software module having the same functionalities than the security modules or a real security module arranged to output the reference dataset to be appended to the control messages.

According to a first embodiment, this sequence of instructions and data is common to all security modules managed by the managing center i.e. independent of user specific set up parameters such as rights, identifiers or keys.

In a second embodiment related for example to the rights management messages EMM, the sequence may be specific to a particular user or a group of users and can include data associated to user rights. In this case the emulator collects data from a database containing user particulars during the execution of the program sequence to be checked. The monitoring process is then performed only on one specific multimedia unit which security module has a given identifier and rights configuration or on a group of units with different identifiers but with same access rights.

At reception of control or management messages the data processing program of the security module is launched as well as a command for analyzing a sequence of instructions according to parameters attached to the command. The analysis gives a result consisting of a check data set which is compared with the reference data set previously extracted from the messages and stored in a memory.

When the reference data set matches with the check data set, the data processing program continues its execution. Otherwise, an interrupt can be send to the processor which stops execution of the program.

According to an embodiment of the method, the reference data set generated by the emulator is completed by program sequence check information indicating which instructions sequence has to be analyzed. These data are appended to the control and management messages sent to the security module. The monitoring module extracts and stores the reference data set and performs the analysis according to the program sequence check information. The advantage of this embodiment is that the analyzed sequence of instructions and the reference data set may be different at each sending of control and management messages for example. Attempts of tampering the data processing program become thus even more difficult thanks to the constant change of the reference data. The reference data sets are thus calculated dynamically by the emulator i.e. at each change of a parameter, a key or of the whole control message a new reference data set is determined and sent to the multimedia unit. The advantage of this dynamic calculation relatively to a fixed self test program like in prior art systems is that program instructions such as (branch, jump, test, etc.) giving different results at each program flow can be immediately reflected.

It has to be noted that several reference data sets and corresponding program sequence check information may be appended to the control and management messages. The monitoring module thus checks several sequences of the data processing program and performs all the related comparisons before complete execution of the program by the processor in case of successful comparisons.

A further object of the invention is a system on chip for security module to be associated to a multimedia unit fit to receive broadcast audio video content data streams including messages, said system on chip comprising at least one processor configured for executing data processing program instructions, a memory, a monitoring module configured for analyzing a sequence of program instructions before execution by the processor on the basis of reference data set appended to the control messages, characterized in that the monitoring module comprises a hardware module activated and deactivated according to program sequence check information related to the reference data set, said check information including parameters describing the sequence of instructions to analyze by the monitoring module.

BRIEF DESCRIPTION OF THE FIGURES

The invention will be better understood with the following detailed description, which refers to the attached figures given as non-limitative examples.

DETAILED DESCRIPTION OF THE INVENTION

Figure 1:
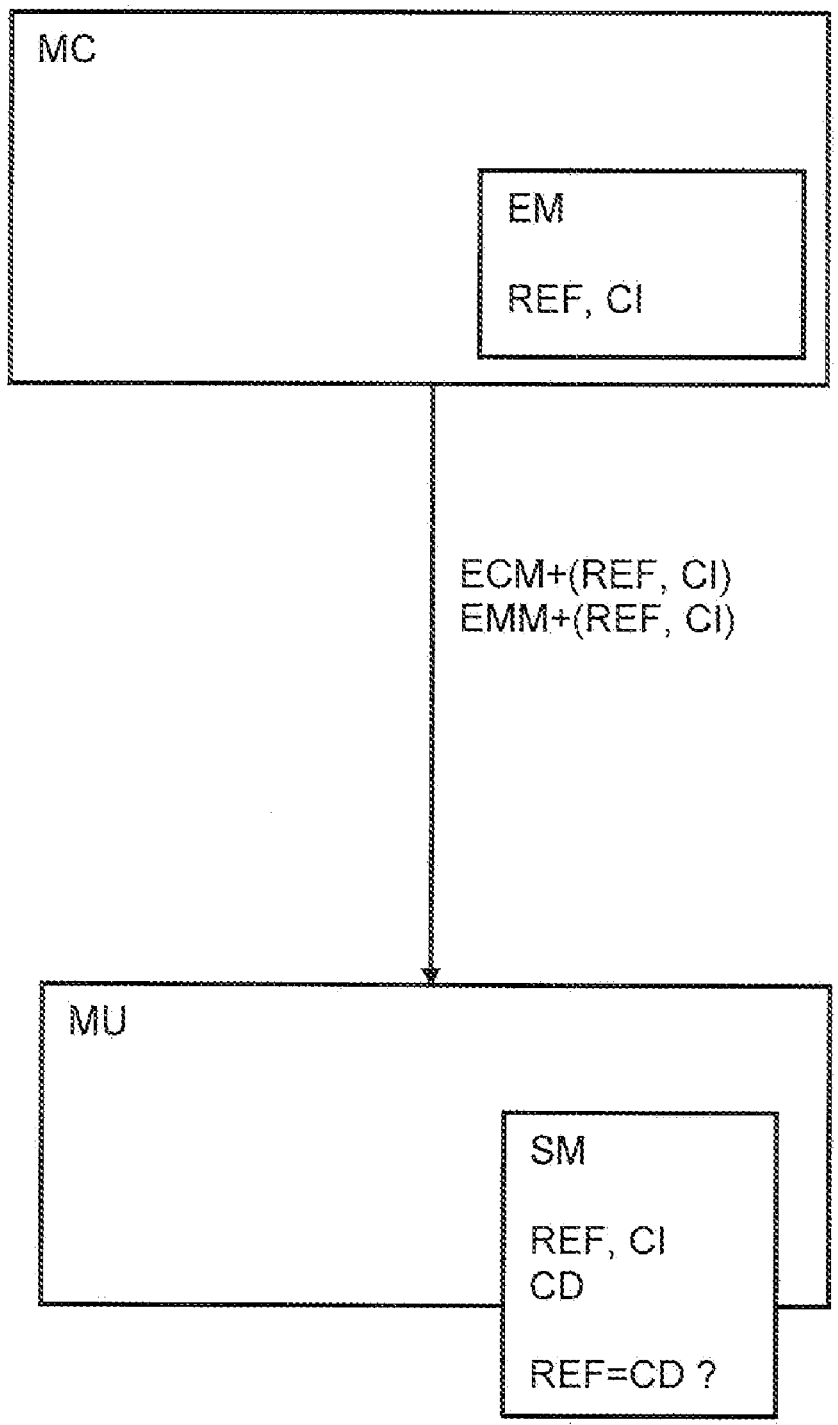
FIG. 1 shows a block diagram of a managing center connected to a multimedia unit including a security module. The managing center comprises a security module emulator for generating reference data intended to the security module for verifying program integrity.

Referring to FIG. 1, the managing center MC, sometimes called head end, managed by an operator controlling access to broadcast multimedia content streams comprises, in addition to the usual data processing devices, a security module emulator EM. The emulator EM may be in form of a particular module representing a functional image of the security modules SM associated to the multimedia unit MU connected to the managing center MC. The emulator EM is in charge of running a data processing program corresponding to the program implemented in the security module SM of the multimedia unit MU to generate at least one reference data set REF. The reference data set REF is produced on the basis of the flow of the program instructions which are executed by following a certain sequence depending on the input control message. Each program instruction is defined by a specific operating code also called opcode accompanied with parameters or data defining variables or addresses for locating data or further instruction in a memory. In an implementation, a predefined sequence of instructions is passed as a value into a mathematical function for producing a data set in the form of an imprint intended to be sent to the security module as a program flow reference. An example of such a function may be a hash function of the type MD5 or any other one way collision free cryptographic function which calculates a digest or several digests of a chain or respectively chains of instructions. The managing center MC sends the reference data sets REF preferably appended to or encapsulated into Entitlement Control Messages ECM or into Entitlement Management Messages EMM.

As is well known, in order to be able to access encrypted multimedia audio video data, several streams are broadcast to a plurality of multimedia units made up of a set top box or decoder including a security module. These streams are, in particular, on one hand the encrypted multimedia data stream and on the other hand, a stream of control messages ECM allowing the decryption of the data stream. The content of the multimedia data stream is encrypted by control words, either in form of keys or information allowing the determination of the control words, included in the ECM messages. During the decryption of a control message ECM, the security module, verifies that the right to access the concerned multimedia content is present. This right can be managed by the EMM messages which role is to load this right into the security module. The EMM messages may also contain software updates, corrective patches, or information or elements allowing the management of the security module or the associated multimedia unit.

Optionally, the reference data set REF appended to the control or management messages ECM/EMM is accompanied with program sequence check information CI related to the reference data set REF. The check information CI includes parameters describing the instructions sequence selected by the emulator EM to generate the reference data set REF. For example, a sequence of instructions can be defined by a start and an end address, a number of opcodes from a given address or any other suitable range of codes used for locating instructions in a program.

At reception of an ECM/EMM message by the multimedia unit, the processing program of the security module reads first the program sequence check information CI before analyzing the instructions of the processing program for calculating the reference data set REF. An advantage of this additional information is that the instruction sequence to verify can be changed at anytime by the managing center.

Preferably, the reference data set REF and the program sequence check information CI are encrypted by a key known by the security module. The complete ECM/EMM message with the additional data may also be encrypted by the same or a different key.

Figure 2:
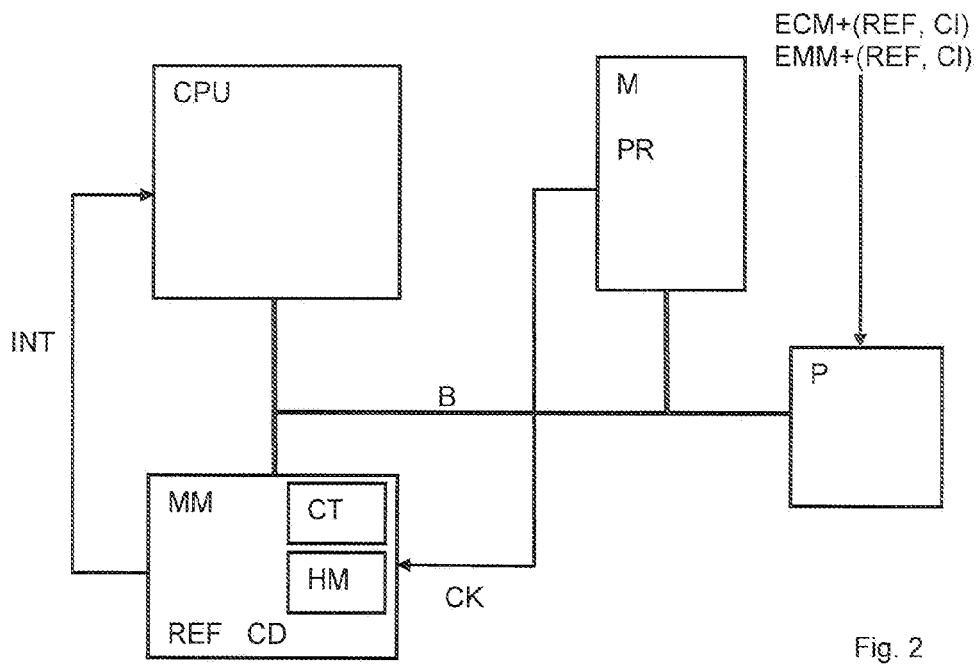
FIG. 2 shows a block diagram of a security module comprising a processor, a memory, a monitoring module for verifying program instructions sequence integrity by comparing reference data set received from a control message with check data set determined by the monitoring module.

The block diagram of FIG. 2 represents a simplified structure of a security module able to carry out the method of the invention. The security module SM comprises components such as a processor CPU, non volatile memories M storing the processing program PR, a monitoring module MM and peripheral modules P with interfaces configured for receiving data from the multimedia unit. All these components or modules are linked together with a bus B for data exchange and signaling.

The processor (CPU), the memory (M) and the monitoring module (MM) preferably form a system on chip specially featured to be integrated in a security module for multimedia units. For processing ECM/EMM messages including program sequence check information CI accompanying the reference data set (REF), the monitoring module (MM) preferably comprises a hardware module (HM) which is activated and deactivated according to the program sequence check information CI. The check information (CI) includes monitoring module (MM) start and stop instructions with the necessary range parameters defining the program sequence to analyze.

When the security module SM receives an ECM/EMM message, a peripheral module P decrypts the ECM/EMM message with a key stored in a memory and extracts the reference data set REF added by the emulator EM of the managing center MC for storing it in a memory associated to the monitoring module MM. Subsequently, the processor CPU starts the data processing program PR which includes a command CK for activating the monitoring module MM and the checking process. The monitoring module MM is preferably implemented as a hardware module separated from the processor CPU with which it communicates through the bus B. An advantage of a monitoring module MM separated from the processor CPU is that the program integrity checking operations are not based on the processor and thus they can not be bypassed by a hacker trying to introduce jump opcodes into the processor program.

The command CK may include a check start parameter and the length or the number of the program instructions sequence to check. In an embodiment, the command CK is divided into two parts such as a first sub-command for starting the check and a second sub-command for stopping the check. The monitoring module MM analyses the instructions or opcodes of the sequence determined according to the parameters of the command CK and calculates a check data set CD in the same manner as performed by the emulator EM for calculating the reference data set REF. The check data set CD is then stored in a memory of the monitoring module MM in order to be compared with the reference data set REF previously extracted from the ECM/EMM message. The result of the comparison is sent by the monitoring module MM to the processor CPU in form of an instruction INT which enables the processor to continue the execution of the data processing program if the check data set CD matches with the reference data set REF. The term "matches" means as well as identity of the check data set CD and the reference data set REF as a predefined relation between the two data sets defined by a mathematical function for example.

According to an embodiment, the right management messages EMM carry user or user group specific reference data set (REF) defined by an execution of the data processing program by the emulator in an environment taking account of a particular security module and/or multimedia unit identifier and rights configuration. The user particulars and identifiers are generally collected from a subscriber database accessible by the managing center. This particular reference data set is appended to an EMM message in charge of rights updates. At reception of the EMM message the monitoring module checks the data processing flow including the specific user data before updating the rights stored in the security module. The update is then performed only when the check data set CD matches with the references data from the EMM message. A mismatch between the data sets could mean that the stored rights have been previously modified either by hacking the data processing program or through any other attacks against the data stored in the security module memory.

According to an example of implementation, the monitoring module MM is connected to the code bus B like a Memory Management Unit MMU or a Memory Protection Unit MPU: any fetch goes through a filter that triggers or not an action. In an embodiment of the method, the idea is to have some part of the program code stored in the memory M executable without mandatory control by the monitoring module MM.

This part is typically the start of the code, when the control message ECM/EMM is received and the reference data REF is extracted and feed to the monitoring module MM. It contains an idle loop and the beginning of the control message ECM/EMM processing, until the end of the reference data REF processing.

Then the code enters the part that is enforced by the monitor module MM. By that time, if the monitor has not been started by specific instructions in the code, it will start automatically. If no data has been feed into it, it will stop immediately the processor CPU by sending an alarm, an interruption, a reset, or any other warning signal. If a check is performed, it will either have another reference data REF already loaded, or it will reinitialize itself. That means also that if the check is done in the enforced part of the program code and no further reference data REF had been feed into it, it will stop after the check. If the code running at the moment of the check is out of the enforce code part, the situation will be the same as at the beginning of the process.

For example, this initialization can be done by initializing the length of code to check to zero and setting the check result to false, in the case where the length of code is the triggering value.

Another way to enforce the monitoring module MM is to give to the code some delay before starting of the monitoring module MM. This delay corresponds to the time or number of opcodes necessary to extract and process the reference data REF and feed it to the monitor module MM. This embodiment may be applied if the monitored part of program code is one unique bundle of instructions at the beginning of the processing of the control messages ECM/EMM.

In the case of an unexpected difference between the check data set CD and the reference data set REF, the data processing program may have been modified either intentionally or accidentally by external perturbations. In a preferred configuration, the instruction INT prevents further processing of the control messages (ECM, EMM) by the security module (SM). This means that the decryption of broadcast access controlled data streams is disabled because the programs extracting the control words from the ECM messages and managing the rights from EMM messages have not been allowed to complete the processing. In an embodiment a particular sub-program can be activated by the processor CPU for enabling actions such as warning the user of the multimedia unit by an error message, blocking the security module, sending a specific message to the managing center, restricting access rights to certain broadcast streams.

In the embodiment where the ECM/EMM message contains check information CI in addition to the reference data set REF, the command CK activates the monitoring module MM according to the check information CI previously read and loaded into the monitoring module MM by the data processing program PR. The analysis of the data processing program is then based on a sequence of instructions defined by a start and an end point taken from the loaded check information CI and associated to the command CK as parameters.

In a further embodiment, the monitoring module MM includes a counter module CT configured for counting the number of instructions checked to obtain the check data set CD to be compared with the reference data set REF. This counter CT prevents multiple attempts of running the data processing program by an external device for example in order to find out correct check data set CD. If a maximum counter value is reached or exceeded, the monitoring module sends an instruction (INT) to the processor CPU which enables actions similar to the ones enabled when the check data set CD does not match with the reference data set REF. In an embodiment the counter may also be decremented from a preset start value to reach zero when the number of attempts becomes too large.

In a further embodiment, an additional counter may also count the number of unsuccessful comparisons made between the check data set CD and the reference data set REF. If this number exceeds a predefined threshold value, the monitoring module MM sends an instruction INT to the processor CPU which may carry out the same actions than by mismatches between check data and reference data sets (CD, REF). In this particular case, a given number of negative comparison results could be tolerated by the preset counter threshold value. This tolerance aims to render the security module less sensitive to perturbations affecting the program instruction sequence execution by modifying accidently some bits of the check data set CD.

Figure 3:
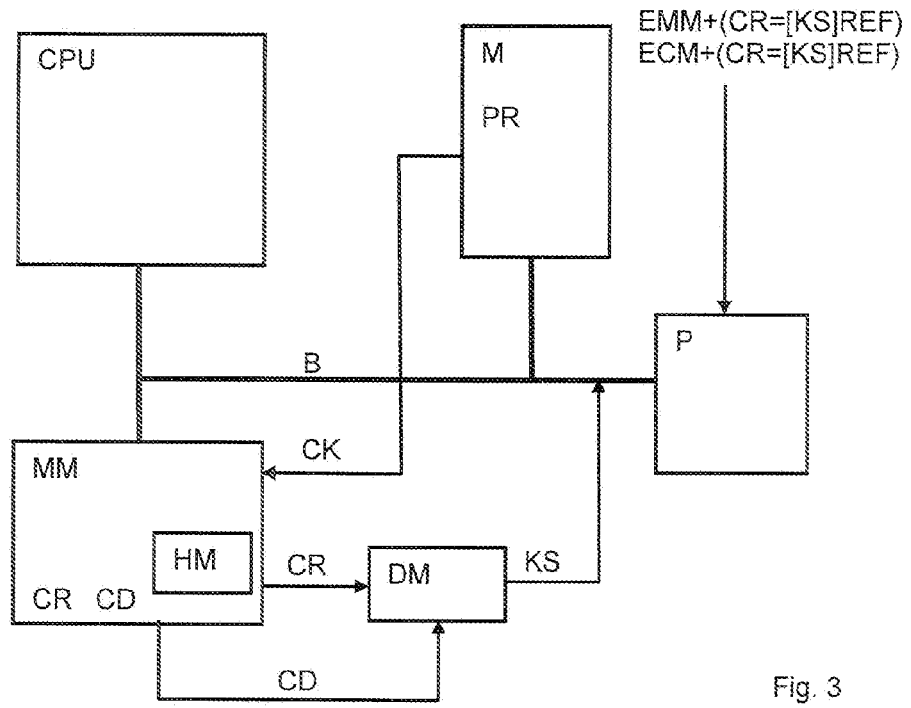
FIG. 3 shows a block diagram of an embodiment of the security module of FIG. 2 where the data attached to the received control message represent a cryptogram formed by a system key encrypted by the reference data set. The program integrity is verified if the result of the decryption of the cryptogram by the check data set is equivalent to the system key.

In a further embodiment illustrated by FIG. 3, the reference data set REF produced by the emulator EM during the execution of program sequence instructions is used, instead of serving in the targeted security module as an immediate program verification, to produce a system key KS that will impact the calculation of the control word.

The system key KS is encrypted with a given algorithm by the reference data set REF (produced by the emulator for a given function) to form a cryptogram CR=[KS]REF that is appended either to ECM entitlement messages or to EMM management messages in charge of setting or renewing a right in the security module.

At reception of an ECM or EMM message by the security module SM, the monitoring module MM extracts and stores the cryptogram CR. A check data set CD is then determined from the analysis of the program sequence instructions as in the previous embodiment. Instead of comparing the obtained check data set CD with the stored cryptogram CR, the monitoring module MM decrypts, thanks to an associated decryption module DM using the inverse of the emulator's algorithm, the cryptogram CR by taking the check data set CD as key.

In a configuration example, the result thus obtained at the output of the decryption module DM is made available as system key KS to the processor CPU, the memories M and the peripherals P of the security module SM through the bus B. This system key KS is used for further processing of ECM messages as for example to decrypt the ECM messages or, in combination with other keys, to obtain the control words CW encapsulated in said ECM messages. The system key (KS) may be also used to decrypt EMM messages containing access rights updates.

In this embodiment, the matching between the cryptogram CR and the check data set CD is determined by the correspondence between the result of the decryption of the cryptogram CR by the check data set CD and the system key KS. In fact, if the reference data set REF is equivalent to the check data set CD, then the cryptogram CR=[KS]REF allows also to obtain the correct system key KS by decryption with the check data set CD. In other words, a correct system key KS can be obtained only when the processing program instructions sequence is conform i.e. if the matching condition between the reference data set REF and the check data set CD is fulfilled.

The processing of the ECM or EMM message is thus successful when the result of the decryption of the cryptogram (CR) corresponds to the system key (KS) meaning that the check data set (CD) matches with the reference data set (REF). Instructions (INT), are then sent by the monitoring module (MM), to the security module processor (CPU). They determine, according to success or failure of ECM or EMM message processing, further execution by the processor (CPU) of the data processing program (PR).

As in previous embodiment, the counter module (CT) of the monitoring module (MM) may count the number of instructions checked to obtain the check data set CD. If a predetermined counter value is reached or exceeded, the instruction (INT) sent to the processor (CPU prevents further processing of the ECM or EMM messages by the security module (SM).

The number of failures of ECM or EMM messages processing may be counted by an additional counter included in the monitoring module (MM) which sends an instruction (INT) to the processor (CPU) if a predetermined threshold value of failures is exceeded: The instruction (INT) also prevents further processing of the ECM or EMM messages.

In case of an error in the program instructions, the decryption of the cryptogram CR will give a resulting key different from the awaited system key KS, therefore the processing of an ECM or EMM message or the program flow will be altered and the received multimedia content data will not be exploitable by the multimedia unit MU.

In this embodiment, the check information data CI may be also appended to the EMM management message or to the ECM control message as in the previous embodiments to define on one hand by the emulator EM, the sequence of program instructions determining the reference data set REF and on the other hand to define, by the security module SM, the instructions sequence determining the check data set CD to be verified.

In a further embodiment, the reference data set REF produced by the emulator EM during the execution of program sequence instructions is used directly as a system key that will impact the calculation of the control word. In this embodiment, the reference data set REF is not transmitted to the security module in the ECM, but the locally computed check data set CD is used instead. In case of an error in the program instructions, the computation of the control words CW with the check data set CD will give a result different from the awaited system control word computed with the reference data set REF, therefore the received multimedia content data will not be exploitable by the multimedia unit MU. The check data set may be also used to decrypt access rights contained in EMM messages.

The invention claimed is:

1. A method for monitoring an execution of a sequence of instructions of a data processing program in a security module associated to a multimedia unit, the multimedia unit being in communication with a managing center configured for supplying control messages authorizing the multimedia unit to access broadcast audio video content data streams, the security module comprising at least one processor configured for executing the data processing program instructions, a memory, a monitoring module configured for analyzing the instructions before execution by the processor and for verifying the result of the analysis by comparison with reference data, the method comprising:

generating, by a security module emulator at the managing center, at least one reference data set by executing the sequence of instructions induced by data of a given control message in the data processing program used by the security module of the multimedia unit;

appending, by the managing center, the reference data set into the control message;

sending, by the managing center, the control message to the multimedia unit with a stream of access controlled audio video content data;
receiving, by the multimedia unit, the control message;
loading, by the multimedia unit, the control message into the security module;
extracting and storing in a memory the reference data set appended into the control message by the managing center;
launching, by the security module, the data processing program including a command activating the monitoring module;
analyzing instructions in the data processing program according to a sequence defined by parameters associated to the command;
generating, by the monitoring module, a check data set resulting from the analysis of the sequence of instructions;
comparing the check data set with the stored reference data set extracted from the control messages; and
sending instructions, by the monitoring module, to the security module processor, the instructions determining, according to a result of the comparison, further execution by the processor of the data processing program.

2. The method according to claim 1, wherein the reference data set encrypts a system key to form a cryptogram, the cryptogram being appended into the control message which is sent to the multimedia unit, the method further comprising:
receiving, by the multimedia unit, the control message;
loading, by the multimedia unit, the control message into the security module for extracting and storing in a memory the cryptogram appended into the control message by the managing center;
launching, by the security module, the data processing program including a command activating the monitoring module for analyzing instructions in the data processing program according to a sequence defined by parameters associated to the command;
generating, by the monitoring module, a check data set resulting from the analysis of the sequence of instructions;
decrypting the cryptogram with the check data set taken as key, and obtaining a result;
using the obtained result for processing the control message;
determining processing of the control message to be successful when the obtained result corresponds to the system key meaning that the check data set matches with the reference data set; and
sending instructions, by the monitoring module, to the security module processor, the instructions determining, according to success or failure of control message processing, further execution by the processor of the data processing program.

3. The method according to claim 1, wherein the security module emulator generates the reference data set on the basis of execution of an instructions sequence independently of the data of the control message.

4. The method according to claim 1, wherein the parameters associated to the command include a check start parameter and a length or a number of the program instructions sequence to check.

5. The method according to claim 1, wherein the command includes a first sub-command for starting the check operation and a second sub-command for stopping the check operation.

6. The method according to claim 1, further comprising appending, by the managing center, program sequence check information to the control message, the check information being related to the reference data set and including parameters describing the sequence of instructions selected by the emulator to generate the reference data set.

7. The method according to claim 4, wherein the command activates the monitoring module according to the check information previously read and loaded into the monitoring module by the data processing program at reception of the control messages.

8. The method according to claim 6, wherein the command activating the monitoring module for analyzing instructions in the data processing program is based on a sequence of instructions defined by a start and an end point taken from the loaded check information and associated to the command as parameters.

9. The method according to claim 1, wherein the instructions sent to the processor in a case of differences between the check data set and the reference data set or a case of failure of control message processing prevent further processing of the control messages by the security module.

10. The method according to claim 1, further comprising:
counting, by a first counter included in the monitoring module, a number of instructions checked to obtain the check data set; and
sending, by the first counter, an instruction to the at least one processor if a predetermined counter value is reached or exceeded, the instruction preventing further processing of the control messages by the security module.

11. The method according to claim 1, further comprising:
counting, by a second counter included in the monitoring module, a number of differences between the check data set and the reference data set or failures of control message processing; and
sending, by the second counter, an instruction to the at least one processor if a predetermined threshold value of failures is exceeded, the instruction preventing further processing of the control messages by the security module.

12. The method according to claim 2, wherein the system key is used for decrypting the control messages.

13. The method according to claim 2, wherein the system key is used for obtaining control words encapsulated in the control messages, the control words allowing decrypting of the access controlled audio video content data of the broadcast stream.

14. A system for monitoring an execution of a sequence of instructions of a data processing program in a security module associated to a multimedia unit, the multimedia unit being in communication with a managing center configured for supplying control messages authorizing the multimedia unit to access broadcast audio video content data streams, the system comprising:
the managing center comprising hardware for implementing a security module emulator;
the security module emulator being configured for generating at least one reference data set by executing the sequence of instructions induced by data of a given control message in the data processing program used by the security module of the multimedia unit;
the managing center being configured for:
appending the reference data set into the control message; and
sending the control message to the multimedia unit with a stream of access controlled audio video content data; and the multimedia unit comprising the security module, the security module comprising:
  at least one processor configured for executing the data processing program instructions;
  a memory; and
  a monitoring module configured for analyzing the instructions before execution by the processor and for verifying the result of the analysis by comparison with reference data;
the at least one processor being further configured for:
  receiving the control message;
  loading the control message into the security module;
  extracting and storing in the memory the reference data set appended into the control message by the managing center;
  launching, by the security module, the data processing program including a command activating the monitoring module; and
  analyzing instructions in the data processing program according to a sequence defined by parameters associated to the command;
the monitoring module being further configured for:
  generating a check data set resulting from the analysis of the sequence of instructions;
  comparing the check data set with the stored reference data set extracted from the control messages; and
  sending instructions to the security module processor, the instructions determining, according to a result of the comparison, further execution by the processor of the data processing program.

15. The system according to claim 14, wherein the reference data set encrypts a system key to form a cryptogram, the cryptogram being appended into the control message which is sent to the multimedia unit;
  wherein the multimedia unit is further configured for:
    receiving the control message;
    loading the control message into the security module for extracting and storing in a memory the cryptogram appended into the control message by the managing center; and
    launching, by the security module, the data processing program including a command activating the monitoring module for analyzing instructions in the data processing program according to a sequence defined by parameters associated to the command; and
  wherein the monitoring module is further configured for:
    generating a check data set resulting from the analysis of the sequence of instructions;
    decrypting the cryptogram with the check data set taken as key, and obtaining a result;
    using the obtained result for processing the control message;
    determining processing of the control message to be successful when the obtained result corresponds to the system key meaning that the check data set matches with the reference data set; and
    sending instructions to the security module processor, the instructions determining, according to success or failure of control message processing, further execution by the processor of the data processing program.

16. The system according to claim 14, wherein the security module emulator is further configured for generating the reference data set on the basis of execution of an instructions sequence independently of the data of the control message.

17. The system according to claim 14, wherein the parameters associated to the command include a check start parameter and a length or a number of the program instructions sequence to check.

18. The system according to claim 14, wherein the command includes a first sub-command for starting the check operation and a second sub-command for stopping the check operation.

19. The system according to claim 14, wherein the managing center is further configured for appending program sequence check information to the control message, the check information being related to the reference data set and including parameters describing the sequence of instructions selected by the emulator to generate the reference data set.

20. The system according to claim 17, wherein the command activates the monitoring module according to the check information previously read and loaded into the monitoring module by the data processing program at reception of the control messages.

21. The system according to claim 19, wherein the command activating the monitoring module for analyzing instructions in the data processing program is based on a sequence of instructions defined by a start and an end point taken from the loaded check information and associated to the command as parameters.

22. The system according to claim 14, wherein the instructions sent to the processor in a case of differences between the check data set and the reference data set or a case of failure of control message processing prevent further processing of the control messages by the security module.

23. The system according to claim 14, further comprising a first counter included in the monitoring module, the first counter being configured for:
  counting a number of instructions checked to obtain the check data set; and
  sending an instruction to the at least one processor if a predetermined counter value is reached or exceeded, the instruction preventing further processing of the control messages by the security module.

24. The system according to claim 14, further comprising a second counter included in the monitoring module, the second counter being configured for:
  counting a number of differences between the check data set and the reference data set or failures of control message processing; and
  sending an instruction to the at least one processor if a predetermined threshold value of failures is exceeded, the instruction preventing further processing of the control messages by the security module.

25. The system according to claim 15, wherein the system key is used for decrypting the control messages.

26. The system according to claim 15, wherein the system key is used for obtaining control words encapsulated in the control messages, the control words allowing decrypting of the access controlled audio video content data of the broadcast stream.

* * * * *